(12) United States Patent
Grosse et al.

(10) Patent No.: US 11,716,376 B2
(45) Date of Patent: Aug. 1, 2023

(54) ARCHITECTURE FOR MANAGING TRANSMEDIA CONTENT DATA

(71) Applicant: DISNEY ENTERPRISES, INC., Burbank, CA (US)

(72) Inventors: Max Grosse, Burbank, CA (US); Barbara Solenthaler, Zürich (CH); Peter Kaufmann, Burbank, CA (US); Markus Gross, Burbank, CA (US); Sasha Schriber, Burbank, CA (US)

(73) Assignees: DISNEY ENTERPRISES, INC., Burbank, CA (US); ETH ZÜRICH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 705 days.

(21) Appl. No.: 15/276,519

(22) Filed: Sep. 26, 2016

(65) Prior Publication Data

US 2018/0091573 A1 Mar. 29, 2018

(51) Int. Cl.
*H04L 67/10* (2022.01)
*H04N 21/25* (2011.01)
(Continued)

(52) U.S. Cl.
CPC ............ *H04L 67/10* (2013.01); *H04N 21/00* (2013.01); *H04N 21/251* (2013.01);
(Continued)

(58) Field of Classification Search
None
See application file for complete search history.

(56) References Cited

U.S. PATENT DOCUMENTS

2008/0301149 A1* 12/2008 Malcolm ............... G06F 16/437
2012/0233347 A1* 9/2012 Lee .................... G06F 17/30017
709/231

(Continued)

OTHER PUBLICATIONS

Pratten, R. "Getting Started with Transmedia Storytelling, a practical guide for beginners", 2nd ed., ISBN: 1515339165, 2015 [retrieved on Nov. 21, 2018]. Retrieved from the Internet: <URL:https://talkingobjects.files.wordpress.com/2011/08/book-2-robert-pratten.pdf>. (Year: 2015).*

(Continued)

*Primary Examiner* — Kevin T Bates
*Assistant Examiner* — Dae Kim
(74) *Attorney, Agent, or Firm* — Kilpatrick Townsend & Stockton LLP

(57) ABSTRACT

A system for managing non-linear transmedia content data is provided. Memory stores a plurality of transmedia content data items and associated linking data which define time-ordered content links between the plurality of transmedia content data items. The plurality of transmedia content data items are arranged into linked transmedia content subsets comprising different groups of the transmedia content data items and different content links therebetween. A control engine receives one or more instructions to create a new time-ordered content link between at least two of the plurality of transmedia content data items. The control engine modifies the linking data stored in the memory to include the new time-ordered content link.

36 Claims, 10 Drawing Sheets

(51) Int. Cl.
*H04N 21/266* (2011.01)
*H04N 21/845* (2011.01)
*H04N 21/00* (2011.01)
*H04N 21/858* (2011.01)
*H04N 21/84* (2011.01)
*H04N 21/258* (2011.01)
*H04N 21/442* (2011.01)
*H04L 67/306* (2022.01)

(52) U.S. Cl.
CPC . *H04N 21/25866* (2013.01); *H04N 21/26603* (2013.01); *H04N 21/44226* (2020.08); *H04N 21/84* (2013.01); *H04N 21/8455* (2013.01); *H04N 21/858* (2013.01); *H04L 67/306* (2013.01)

(56) References Cited

U.S. PATENT DOCUMENTS

| | | | | |
|---|---|---|---|---|
| 2012/0236201 A1* | 9/2012 | Larsen | ................ | H04N 21/439 348/468 |
| 2015/0135071 A1* | 5/2015 | Glotzer | ................ | G06F 3/042 715/716 |
| 2015/0161668 A1* | 6/2015 | Lee | ................ | G06Q 30/0241 705/14.61 |
| 2015/0310498 A1* | 10/2015 | Brandstetter | ...... | G06Q 30/0269 705/14.66 |
| 2016/0041723 A1* | 2/2016 | Ren | ................ | G06F 3/04842 715/765 |
| 2016/0050446 A1* | 2/2016 | Fujioka | ................ | A63F 13/792 725/93 |
| 2017/0289624 A1* | 10/2017 | Avila | ................ | H04N 21/4542 |

OTHER PUBLICATIONS

"Conducttr Quick Start Tutorial", Conducttr.com website, Mar. 19, 2015 [retrieved on Nov. 21, 2018]. Retrieved from the Internet: <https://conducttr-a.akamaihd.net/assets/2015-03/19/1742/ce558acd-5e53-4069-af65-8e5f1d4db376.pdf>. (Year: 2015).*

"Conducttr Author Reference Guide 3.3", Conducttr website, Feb. 14, 2015 [retrieved on May 20, 2021]. Retrieved from the Internet: <URL: https://static.conducttr.com/docs/guides/Author%20Guide%20V3.3.pdf>. (Year: 2015).*

* cited by examiner

ARCHITECTURE FOR MANAGING TRANSMEDIA CONTENT DATA

FIELD OF DISCLOSURE

The present disclosure relates to apparatus, systems and methods for processing transmedia content. For example, the present disclosure implements interconnected devices for managing the processing of transmedia content in a networked environment, where such content may be generated by multiple users and shared between them.

BACKGROUND

Influenced by a variety of different multimedia content types, new digital distribution channels, mobile communication devices and an ever increasing use of social media, industry is currently experiencing a disruption in how media is created, distributed and consumed. Classical production pipelines have become less effective as audiences move towards anytime, anywhere, personalized consumption, substituting TV-centric models with multi-device, multichannel models. Individual customers and groups of customers have also become more interactive and participatory, contributing significantly to the creation of new media. The cycles in the traditional creation-distribution-consumption loop become much shorter as consumers constantly provide feedback, resulting in a trend towards ultrashort form content.

Existing delivery platforms, for example YouTube and Facebook, allow for the creation and editing of simple channel based content, using a basic model whereby content creators can upload content such as video, text or images, and users can consume the content in an isolated, linear and mono-medial manner. This can often be done in conjunction with media presented via other platforms such as television or print media.

At the same time, functionality provided by existing multimedia platforms allows the sharing of user-generated content, which, along with social networking, is transforming the media ecosystem. Mobile phones, digital cameras and other pervasive devices produce huge amounts of data that users can continuously distribute in real time. Consequently, content sharing and distribution needs will continue to increase. The content can be of many different forms, known collectively as "transmedia" content.

Existing systems that allow users to generate, organize and share content are generally hard to control: these systems do not offer adequate tools for predicting what the next big trend will be, and which groupings of time-ordered content resonate with particular audiences. Furthermore, visualising the large amount of multimedia information in a way which users can explore and consume is challenging. In particular, visualisation of such large data sets is challenging in terms of performance, especially on lower-power devices such as smartphones or tablets. It is desirable that any visualisation of the data could be rendered in real time such that immediate visual feedback is provided to a user exploring the data.

In addition, the ever-growing availability of content to multiple users and the ever-increasing power of computing resources available to individual users is driving users towards their own individual creation of content, with such content being in multiple formats. This progression can be seen in FIG. 1. User 10 consumes single content items 15. With increasing computing resources, user 20 has developed into an interactive user making choices which affect the flow of individual content items 25 to the user 20. Further, user 30 has recently become more common by generating multiple personalised, individual content items 35 which can be accessed over the Internet 50 by other users. A problem now exists with a current user 40 who can access a considerable amount of different types of content items 35 over the Internet 50 and desires to utilise such content. It would be desirable for user 40 to be able to contribute to and generate new structured groups 46 of linked content items 45.

SUMMARY OF THE DISCLOSURE

In a first aspect of this disclosure, there is provided an apparatus for managing non-linear transmedia content data comprising:
  a memory configured to store a plurality of transmedia content data items and associated linking data which define time-ordered content links between the plurality of transmedia content data items, the plurality of transmedia content data items being arranged into linked transmedia content subsets comprising different groups of the transmedia content data items and different content links therebetween;
  processing circuitry, in communication with the memory, configured to utilise a control engine to:
  receive, from an electronic device, one or more instructions to create a new time-ordered content link between at least two of the plurality of transmedia content data items; and
  modify the linking data stored in the memory to include the new time-ordered content link.

The aforementioned apparatus permits users to generate, organize and share transmedia content items. In particular, the aforementioned apparatus permits users to group transmedia content into linked subsets.

The apparatus may be implemented as a computing device, for example a server computing device, e.g. at a back end.

In a second aspect of this disclosure, there is provided a system comprising the aforementioned apparatus; and an electronic device configured to be in communication with the apparatus, and further configured to receive user input and thereby communicate with the processor and provide the one or more instructions to create each new time-ordered content link between the at least two of the plurality of transmedia content data items.

The electronic device may be implemented as user equipment, which may be a computing device at a front end, for example a client computing device, such as personal computer, laptop or a handheld computing device. For example, the handheld computing device may be a mobile phone or smartphone. The electronic device may include a user input interface configured to provide user input to the processing circuitry, such as for example the instructions to create a new time-ordered content link. This may be one or more of a keypad or touch-sensitive display. The electronic device may include a display (which may include the touch-sensitive display) configured to output data to a user interacting with the electronic device, including one or more of the content data items.

The electronic device may be configured to be in communication with the apparatus via a wired and/or wireless network connection. At least part of the networked connection may be established over the Internet.

The system may further comprise a plurality of electronic devices each configured to receive user input and thereby communicate with the processor and provide instructions to create time-ordered content links between at least three of the plurality of transmedia content data items.

The memory may be further configured to store: a plurality of user data items, each data item being associated with a user of the system, wherein each user of the system may be associated with one or more of the user data items.

The plurality of user data items may comprise at least user identification data for each user of the system. The plurality of user data items may comprise a user profile for each user of the system. The user profile may comprise, for the each user of the system, one or more of: user preference data pertaining to the each user's preferences; user behaviour data pertaining to the each user's online behaviours; user interaction data pertaining to the each user's interaction with other users; and/or user location data pertaining to the current determined and/or past determined location of the each user.

The processing circuitry may be further configured to provide a user modelling engine configured to identify user interaction of a given user with the one or more content items and update the user interaction data of the given user to be indicative of the one or more transmedia content items thereby interacted with.

The memory may be further configured to store a plurality of content characterisation data items, each content characterisation data item characterizing one or more of the transmedia content data items, wherein each content characterisation data item is associated with at least one or with a plurality of the content data items.

The each content characterisation data item may characterize one or more of the transmedia content data items with one or more of the following:
  auditory characterisation data pertaining to one or more auditory components of the one or more transmedia content data items;
  visual characterisation data pertaining to one or more visual components of the one or more transmedia content data items;
  textual characterisation data pertaining to one or more textual components of the one or more transmedia content data items; and
  interaction characterisation data pertaining to one or more interactive components of the one or more transmedia content data items.

The processing circuitry may be further configured to provide a content subset modelling engine configured to process at least one content characterisation data item for each transmedia content data item in a given transmedia content subset and thereby generate unique subset characterisation data for the given transmedia content subset based on the processed characterisation data.

The processing circuitry may be further configured to provide a recommender engine configured to process the characterisation data items and the user data items for a given user and identify, from the characterisation data items, transmedia content data items which are sufficiently similar to preferred content items of the given user and surface the sufficiently similar items to the given user.

The transmedia content data items may relate to narrative elements of the transmedia content data items. The time-ordered content links can define a narrative order of the transmedia content data items.

Each time-ordered content link may defines a directional link from a first transmedia content data item to a second transmedia content data item of the plurality of transmedia content data items. The first transmedia content data item may have a plurality of outgoing time-ordered content links.

The second transmedia content data item may have a plurality of incoming time-ordered content links.

The memory may be further configured to store a plurality of subset entry points for the plurality of transmedia content subsets. Each subset entry point may be a flag indicating a transmedia content data item that has at least one outgoing time-ordered link and no incoming time-ordered links.

Each linked transmedia content subset may define a linear path, wherein a linear path can comprise a subset entry point, one or more transmedia content data items and one or more time ordered links between the subset entry point and the transmedia content data items.

Two or more transmedia content subsets may share one or more subset entry points, one or more transmedia content data items and/or one or more time ordered content links.

The processing circuitry may be configured to transmit transmedia content data comprising the linking data and one or more of the transmedia content items to the electronic device.

The electronic device can be configured to receive the transmedia content data. The electronic device may be configured to output the transmedia content data on an output device connected to the electronic device such that a user of the electronic device is presented with the transmedia content data items.

The electronic device may be configured to accept input, via a user input interface, indicative of a subset entry point. The electronic device may be configured to output the transmedia content data item indicated by the selected subset entry point. The electronic device may be configured to display each subsequent transmedia content data item in turn according to the time-ordered links between the transmedia content data items.

The electronic device may be configured to receive input, via a user input interface, indicative of one of a plurality of transmedia content subsets when the currently output transmedia content data item is shared among the plurality of transmedia content subsets. The electronic device may be configured to receive input, via the user input interface, to skip a selected transmedia content data item and output to display a selected transmedia content data item.

The electronic device may further implement a communication layer, wherein the transmedia content data can be received via the communication layer and instructions are provided to the processor via the communication layer. The communication layer may be configured to check that a user account associated with the electronic device is permitted to view the transmedia content data and/or provide one or more instructions to create a new time-ordered content link between at least two of the plurality of transmedia content data items.

The communication layer may be configured to prevent the electronic device from outputting the transmedia content data and/or providing one or more instructions to create a new time-ordered content link if the user account is not permitted.

The system may further comprise an experience control layer, wherein the processing circuitry may be configured to transmit the transmedia content data to the electronic device via the experience control layer, and wherein instruction to create a new-time ordered content link can be received from the electronic device via the experience control layer.

The experience control layer may be configured to check that a user account associated with the electronic device is permitted to view the transmedia content data and/or provide one or more instructions to create a new time-ordered content link between at least two of the plurality of transmedia content data items.

The communication layer may be configured to prevent the electronic device from outputting the transmedia content data and/or providing one or more instructions to create a new time-ordered content link if the user account is not permitted.

In a third aspect of this disclosure, there is provided a computer-implemented method for managing non-linear transmedia content data comprising:

providing a memory configured to store a plurality of transmedia content data items and associated linking data which define time-ordered content links between the plurality of transmedia content data items;

arranging the plurality of transmedia content data items into linked transmedia content subsets comprising different groups of the transmedia content data items and different content links therebetween;

receiving one or more instructions to create a new time-ordered content link between at least two of the plurality of transmedia content data items; and modifying the linking data stored in the memory to include the new time-ordered content link.

BRIEF DESCRIPTION OF DRAWINGS

The present invention is described in exemplary embodiments below with reference to the accompanying drawings in which.

DETAILED DISCLOSURE

Figure 1:
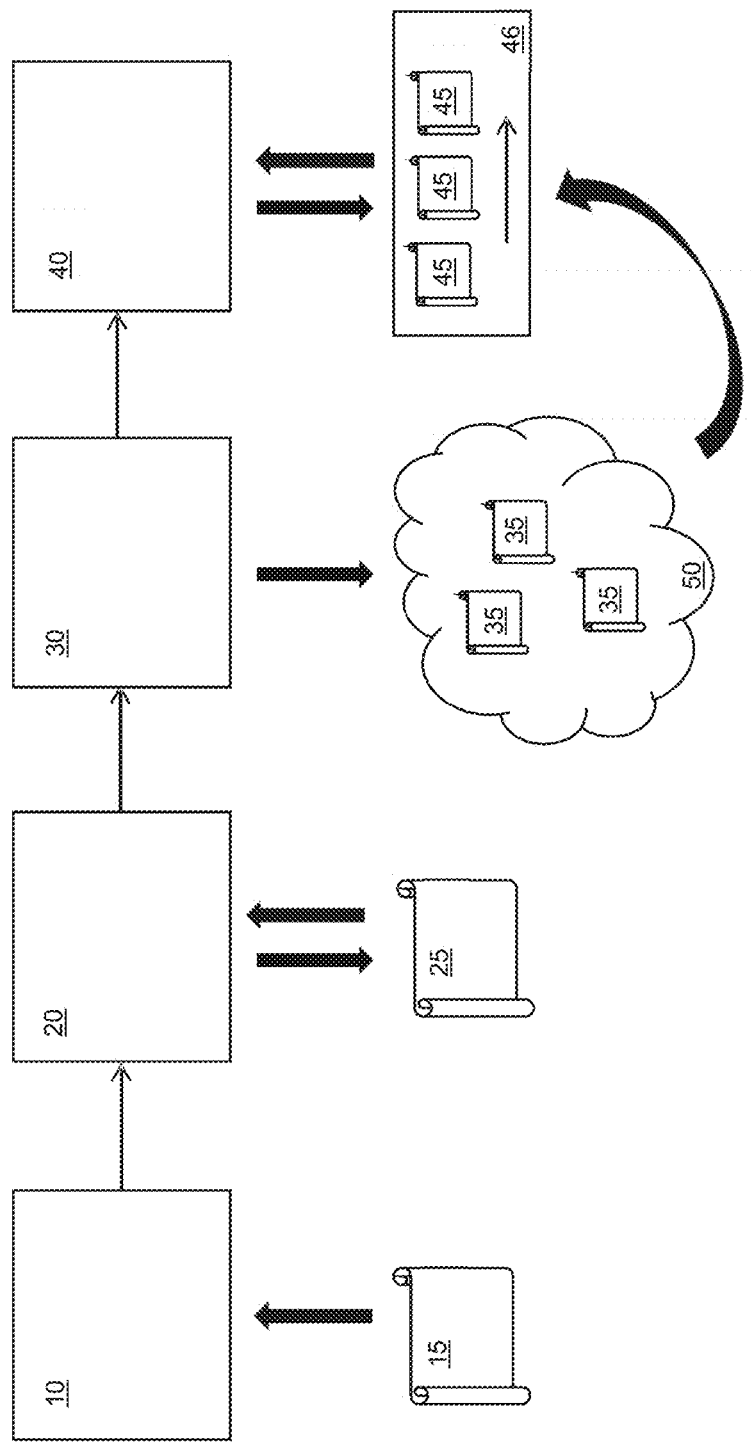
FIG. 1 depicts how users interact with content items according to the present disclosure.

The present disclosure provides for a new apparatus, system and method for managing transmedia content. In one embodiment, there is disclosed a platform for the creation, distribution and consumption of transmedia content. The content may be arranged in a time-ordered manner for consumption, thereby defining so-called "story" based content.

In the context of the present disclosure, groups of time-ordered content, for example in the form of stories, are made up of multiple elements of transmedia content, each being referred to herein as a transmedia content data items. Each item can pertain to a narrative element of the story. Each transmedia content data item may be linked, and thus connected, to one or more other transmedia content data items in an ordered fashion such that a user can navigate through subsets of the transmedia content data items (also referred to as transmedia content subsets) in a time-ordered fashion to consume some or all of an entire story.

The term "transmedia" means that the grouped content data items (which are linked within the content subsets) comprise a plurality of different multimedia types, e.g. at least two different types of multimedia content. For example, the different types of transmedia content data of each content data item within the subset can comprise at least two different types from one or more of the following: textual data, image data, video data, audio data, animation data, graphical visualization or UI data, hypertext data, gaming data, interactive experience data, virtual reality (VR) data, augmented reality data, and multisensory experience data. Each transmedia content data item may itself comprise multiple media types, e.g. video and audio data may be present within a single item such that the audio is time-associated associated with the video.

The transmedia content data items can be grouped into transmedia content subsets. Each subset may be grouped based on one or more non-linear network of the content data items.

Within each transmedia content subset, transmedia content data items are linked to one another, directly or indirectly, by time-ordered links between each data item. Typically, each time ordered-content link links two transmedia content data items. An exception exists for a time ordered link which connects a subset entry point and a transmedia content data item as explained below. The time-ordered link also defines a direction between the two transmedia content data items. The direction indicates an order in which linked transmedia content data items should be presented to a user of the system. For example, when a first transmedia content data item is presented to a user, at least one outgoing time-ordered link (i.e. the direction defined by the link is away from the first transmedia content data item) indicates a second transmedia content item that should be presented to the user next.

The term "subset" is used to denote a subset of transmedia content data items within the set of all transmedia content data items stored by the system. The transmedia content data items that are part of a transmedia content subset are all directly or indirectly connected to each via time-ordered content links between the transmedia content data items. A transmedia content subset may be a linear, i.e. each transmedia content data item in the subset has at most one incoming time-ordered content link and one outgoing time-ordered content link, or a non-linear network, i.e. one or more of the constituent transmedia content data items has more than one incoming or outgoing time-ordered content link. It will also be appreciated a non-linear network of transmedia content data items can be considered to be made up of multiple overlapping linear paths from start-point to end-point through that network, and that each linear path may also be considered to be a transmedia content subset. Furthermore, the term "group" has been used to denote a collection of transmedia content data items that are not necessarily connected, directly or indirectly, via time-ordered content links. However, where the term "group" has been used, a "subset" of transmedia content data items, as defined above, may additionally be formed and utilised.

Each time-ordered link is stored in memory as link data comprising: the input content data item; and the output content data item and thus implicitly a direction between two content data items. Directional data for the links is also stored which defines the path the links should be processed, and thus the order for processing of transmedia content items. The order can also be dependent on user interaction with each item as it is surfaced to a user.

Figure 2C:
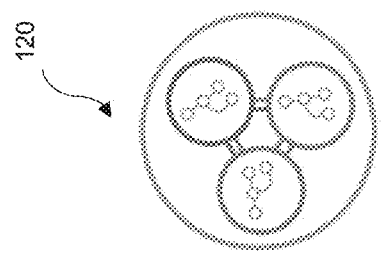
FIGS. 2A, 2B and 2C depict a linear transmedia content subset, grouped non-linear transmedia content subsets, and a subset universe respectively, each formed of multiple transmedia content data items and time-ordered content links.
Figure 2B:
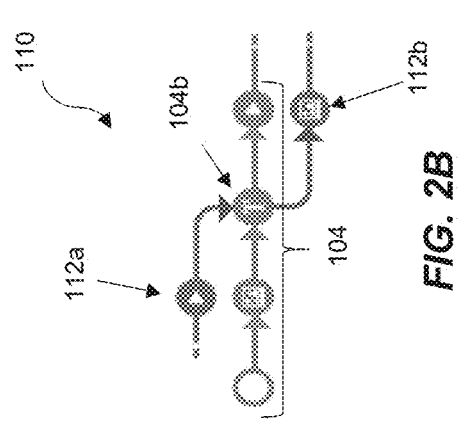
Figure 2A:
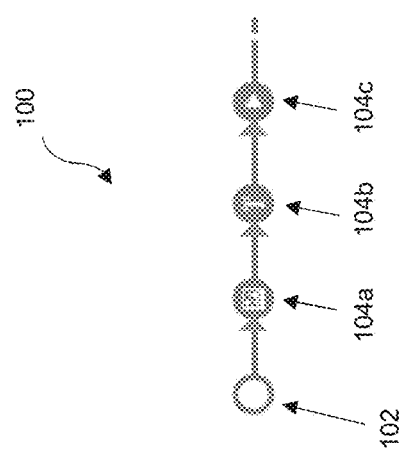

Examples of transmedia content subsets are depicted in FIGS. 2A, 2B and 2C. As mentioned above, the transmedia content data items are grouped into transmedia content subsets.

In FIG. 2A, subset 100 defines a linear path of transmedia content data items 104a-c. The subset 100 also comprises a subset entry point 102, which defines a starting point in the subset from which the system can commence presenting the transmedia content data items within the subset. The subset entry point 102 may be linked to the first transmedia content data item 104a by a time-ordered link, or may be a flag associated with the first transmedia content data item 104a which indicates that the transmedia content data item 104a is the first in the subset.

In the context of the present disclosure, the term "linear" means that each transmedia content data item has, at most, only one incoming time-ordered line (i.e. the direction defined by the link is inwards towards the transmedia content data item) and only one outgoing time-ordered link. The path defined by the transmedia content subset 100 is unidirectional and there is only one possible route from the subset entry point 102 and the final transmedia content data item of the path (i.e. a transmedia content data item with an incoming time-ordered link but no outgoing time ordered link).

The transmedia content data items may also be grouped based on multiple content subsets in a non-linear network, such as non-linear network 110 depicted in FIG. 2B. In this context, the term "non-linear" means that time-ordered links between the data items of each network may form a plurality of different paths through the network 110 which start in different places, end in different places, branch, split, diverge, leave some data items out of the path and/or overlap with other paths. Such a non-linear network 110 can also be considered to be a group of transmedia content subsets which share one or more transmedia content data items and/or time-ordered content links.

In the depicted non-linear network 110, each transmedia content data item 104a-c, 112a-b can have one or more incoming time-ordered links and one or more outgoing time-ordered links. The data items 112a, 104b and 112b form a second transmedia content subset which shares the data item 104b with the first transmedia content subset 100.

FIG. 2C depicts a story universe 120, in which multiple, related non-linear networks are grouped or clustered together. In one embodiment, the non-linear networks of a story universe do not share transmedia content data items and/or time-ordered links with the non-linear networks of another, different story universe. However, in an alternative embodiment, the non-linear networks of a story universe do share one or more transmedia content data items and/or time-ordered links with the non-linear networks of another, different story universe.

The system of the present disclosure manages the transmedia content data items, transmedia content subsets and one or more non-linear networks, facilitates the generation and manipulation of items between and within subsets and networks so that storylines can be formed. Accordingly, the creation of transmedia content subsets and non-linear networks by a user of the system enables collaboration between users of the system and allows consumption of the created storylines. The architecture of the system is depicted in FIG. 3.

Figure 3:
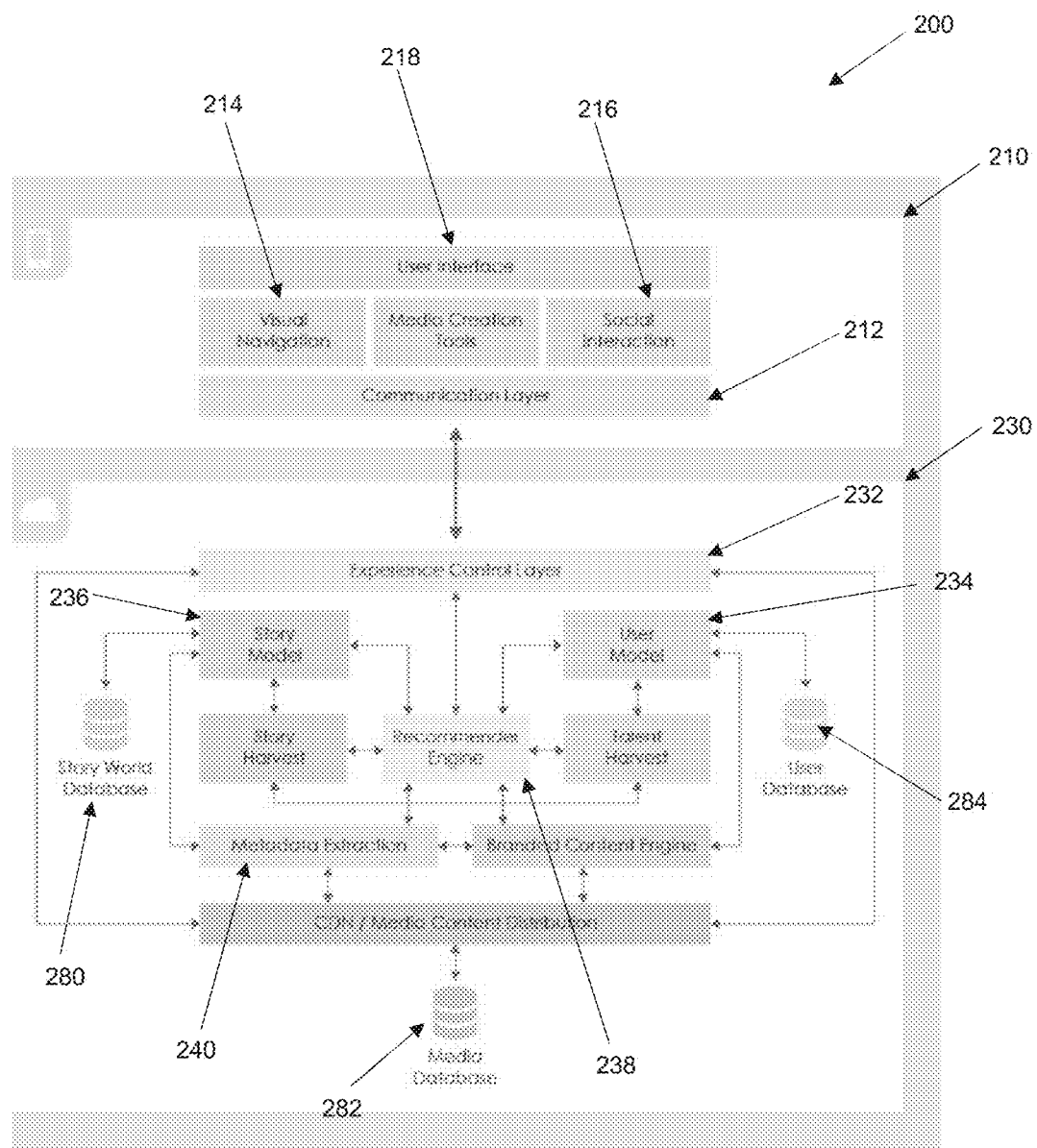
FIG. 3 depicts the architecture of the system of the present disclosure.

FIG. 3 depicts the overall architecture of the system 200. The system 200 includes a front end device 210, which is typically located on a user device such as a smartphone, tablet or PC that is operated directly by the user of the system 200, and a back end device 230, which is typically located on one or more servers that are connected to the user device via a network such as the Internet.

The back end 230 contains global resources and processes that are managed, stored and executed at a central location or several distributed locations. The front end 210 contains resources and processes that are stored and executed on an individual user device. The back end 230 is responsible for tasks that operate on large amounts of data and across multiple users and stories, while the front end 210 only has access to the resources of a particular user (or a group of users) and focuses on presentation and interaction.

The front end 210 communicates with the back end 230 via the network, the communication layer 212 that is part of the front end 210 and the experience control layer 232 that is part of the back end 230. The experience control layer 232 is responsible for handling the distribution of transmedia content data items, access limitations, security and privacy aspects, handling of inappropriate content data items, and user-specific limitations such as age group restrictions. It ensures that inappropriate, illegal, unlicensed or IP-violating content is flagged and/or removed, either automatically, semi-automatically or manually. It also handles sessions as the user interacts with the system and provides session specific contextual information, including the user's geolocation, consumption environment and consumption device, which can then be used by the front end 210 to adapt the consumption experience accordingly. The experience control layer 232 also acts as a checkpoint for content validation, story verification, and story logic, in order to provide users with a consistent story experience.

The communication layer 212 performs client-side checks on permissions, content validation, and session management. While the final checks happen at the experience control layer 232 of the back end 230, the additional checks carried out in the communication layer 212 help in providing a consistent experience to the user (e.g. not displaying content or features that cannot be accessed).

The front end 210 also includes the user interface (UI) component 220, which is responsible for displaying and presenting the transmedia content data items to users, including visual, auditory and textual representations, and is also responsible for receiving the user's input through pointing devices, touch events, text input devices, audio commands, live video, or any other kind of interaction. The UI component 218 can adapt to the user's location, environment, or current user state in order to provide an optimized experience.

The visual navigation component 214 is also included in the front end 210, and allows a user to explore, browse, filter and search the transmedia content data items, transmedia content subsets and non-linear networks, and any other content provided by the platform. For navigation in the context of transmedia content and stories, the visual navigation component 214 provides intelligent abstractions and higher-level clusterings of transmedia content data items, transmedia content subsets and non-linear networks, providing the user with an interface for interactive visual exploration of the transmedia content, which enables the user to make navigation choices at a higher-level abstraction before exploring lower levels, down to single stories, i.e. transmedia content subsets, and individual transmedia content data items. The structure of transmedia content subsets and non-linear network and the time-ordered links between transmedia content data items data items is visualized as well, providing the user with information on how these data items are related to each other. In one embodiment of this visualisation, a graph structure is employed, with nodes representing transmedia content data items, and connections representing the time-ordered content links. In the main, the evolution of the transmedia content subsets and non-linear networks is rendered in real-time as the subsets and non-linear networks are created and modified by all users of the system. In addition, in a particular embodiment which is user initiated, for example via user selection or automatically based on user interaction, e.g. immediately or shortly after a given user logs in to the system, the recent past evolution of the transmedia content subsets and non-linear networks, e.g. the evolution since last login of the given user can be displayed graphically, e.g. in a time lapse rendering of the changes of the transmedia content subsets and non-linear networks in the order in which they occurred. The operation of the visual navigation component 214 is described in more detail with respect to FIGS. 9A and 9B below.

The social interaction component 216 handles visualisations and user input related to interactions between individual users of the system 200. It provides tools for editing a user's public information, enabling notifications on other users creating content ('following'), endorsing and rating other users' content, and directly interacting with other users through real-time messaging systems, discussion boards, and video conferencing. These tools also allow users to collaboratively create new content (i.e. transmedia content data items) and author and edit stories (i.e. transmedia content subsets and/or non-linear networks), as well as define the access rights and permissions associated with such collaborative work. The enforcement of these rights is handled by the experience control layer 232, as mentioned above.

In addition to the experience control layer 232, the back end 230 comprises a user model component 234, a story model component 236, a recommender engine 238, and a metadata extraction component 240, in addition to one or more data stores or computer memory for storing data related to the transmedia content such as the transmedia content data items, linking data, transmedia content subsets, non-linear networks, and metadata relating to the individual data items and linking data as well as to the subsets and non-linear networks.

Figure 8:
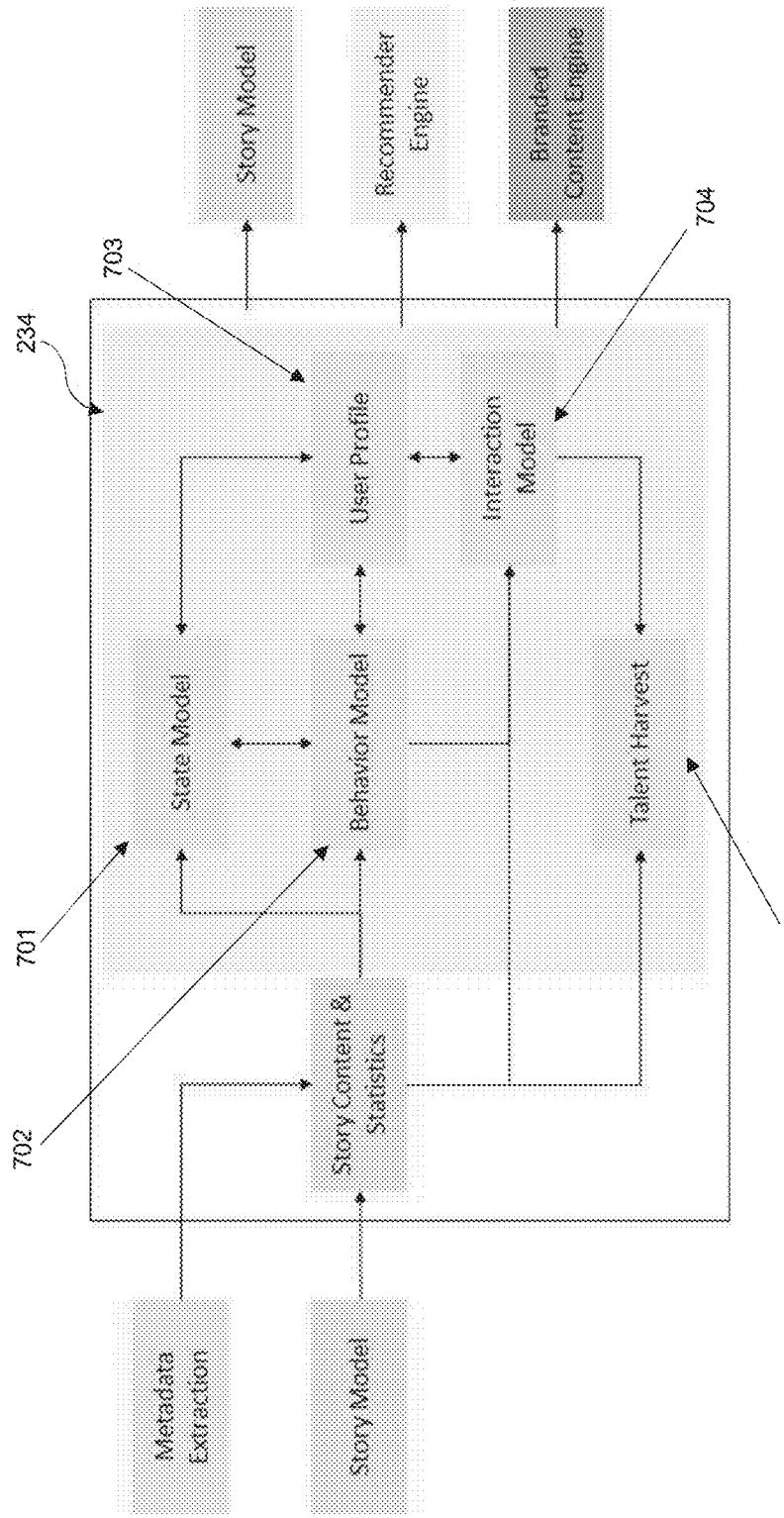
FIG. 8 depicts a user model component of the system.

The user model component 234 represents user behaviour and properties. It is driven by a suite of algorithms and data collections, including but not limited to statistics, analytics and machine learning algorithms operating on user interaction patterns, consumption behaviour and social interactions. The analytics happens in real-time and the user model component 234 is continuously updated as the user interacts with the system 200. Additional information such as the user's geolocation can be taken into account as well. The corresponding data is stored in a user database. The user model component 234 also comprises models for groups of several users, which for example emerge during multiuser collaboration, consumption, geolocation, or social interactions. As part of the user model component 234, users and/or groups of users are profiled and characterized according to their personality, productivity stage and other criteria. The user model component allows the system to make predictions of user behaviour under real or hypothetical conditions, which then feed into the recommender engine component 238. The methods employed by the user model component for prediction user behaviour and creative state are described below in more detail with respect to FIG. 8. The user model component 234 also permits the correlation of interaction patterns of users not identified to the system so as to re-identify users probabilistically.

The user model component 234 is also connected to the talent harvest component, which, based on user behaviour, identifies individual users or groups of users that fulfil certain criteria such as, for example, having a large amount of users consuming or endorsing their work, having significant influence on other users' behaviours and opinions, or being highly popular personalities. The talent harvest component, in concert with the recommender engine component 238, then influences the behaviour of such users of the system 200.

The story model component 236 characterises the content of single transmedia content data items, transmedia content subsets, non-linear networks and whole story universe, and stores the corresponding data in a story world database. The characterisations are found through algorithms such as, but not limited to, metadata extraction, analytics, graph analysis, or any other algorithms operating on connections between content in general. Metadata extraction extends to include visual, auditory or textual elements, as well as higher-level concepts like characters, character personality traits, actions, settings, and environments. The characterisation also takes into account how users interact with the content, including the analysis of consumption patterns, content ratings and content-related social interaction behaviour. The corresponding updates of the story model component 236 happen in real-time as users interact with the system 200 or as new content is created or existing content is modified. Additionally, the story model component 236 makes use of story, characterisations (including metadata) to model story logic. Using story reasoning, the consistency of individual stories can be verified and logical inconsistencies can be prevented either when a story is created or at the time of consumption. The story model component 236 also communication with the story harvest component, which uses the data provided by the story model component 236 in order to identify and extract content (transmedia media content data items, transmedia content subsets, non-linear networks or higher-level abstractions).

The recommender engine component 238 is in communication with both the story model component 236 and the user model component 234 and provides conceptual connections between the story model component 236 and the user model component 234. The recommender engine component 238 uses data analytics to match content (transmedia content data items, transmedia content subsets, non-linear networks) with users, suggesting users for collaboration, suggesting content to be consumed, or suggesting stories, story arcs or story systems to be extended with new content. It also takes into consideration products and brands as a third dimension, resulting in an optimization in the three-dimensional user-story-brand space. Recommendations can be explicit, with recommendations being explicitly labelled as such to the user, guiding the user through a transmedia content subset or non-linear by providing an optimal consumption path or suggesting other users to collaborate with, or they can be implicit, meaning the user's choice is biased towards certain elements of content (including transmedia content, advertisement, users), without making the bias explicitly visible to the user.

The metadata extraction component extracts metadata from transmedia content (i.e. transmedia content data items, transmedia content subsets and/or non-linear networks) automatically, semi-automatically, or manually. The metadata extraction component 240 tags and annotates transmedia content, providing a semantic abstraction not only of the content of individual transmedia content data items, but also of the time-ordered links, transmedia content subsets, non-linear networks, and story systems. The derived metadata thus spans a horizontal dimension (cross-domain, covering different types of media) as well as a vertical one (from single transmedia content data items to whole story systems).

Also depicted in FIG. 3 are story world database 280, media (content) database 282 and user database 284. The databases 280-284 are stored in memory 301 of server device 230. The story world database 280 stores data characterising and defining the structure of the transmedia content subsets, non-linear networks and whole story systems, for example by way of linking data defining the subset structure. Additionally, metadata and graph analytics pertaining to the subsets and networks may also be stored in the story world database 280. The media database 282 stores individual content items, and data characterising the content of individual transmedia content data items, e.g. metadata and graph analytics for the individual content items. The user database 284 stores user data pertaining to users of the system 200, including user behaviour data defining how users have interacted with individual content items and subsets, and user preference data defining user indicated or derived preferences for content items and subsets.

Figure 4:
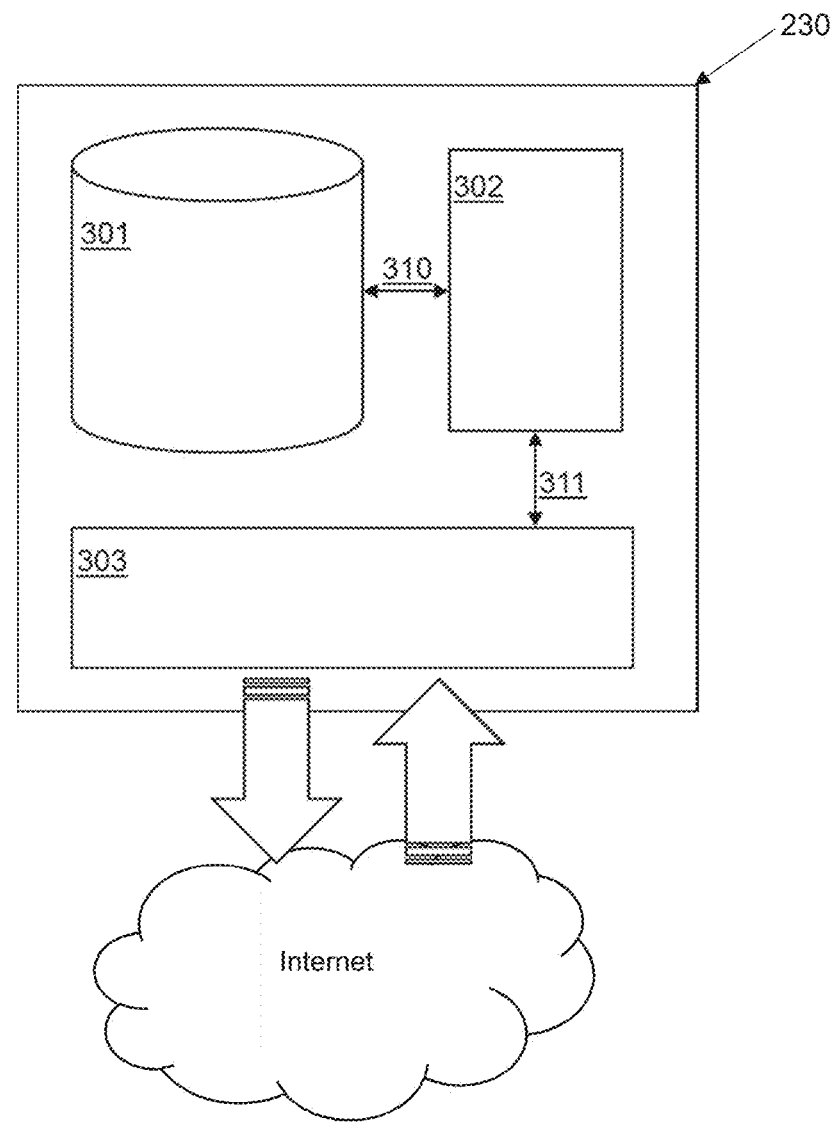
FIG. 4 depicts an exemplary apparatus on which the back end of the present disclosure operates.

FIG. 4 depicts an exemplary server device 230 on which the back end 230 of the system 200 is implemented. It will be appreciated that the back end 230 or functional components thereof may be implemented across several servers or other devices. The server device 230 includes the memory 301, processing circuitry 302 and a network interface 303. The memory may be any combination of one or more databases, other long-term storage such as a hard disk drive or solid state drive, or RAM. As described above, the memory 301 stores the transmedia content data items and associated linking data, which define time-ordered content links between the plurality of transmedia content data items. The plurality of transmedia content data items are arranged into linked transmedia content subsets comprising different groups of the transmedia content data items and different content links therebetween. The processing circuitry 302 is in communication with the memory 301 and is configured to receive instructions from a user device via the network interface to create new time-ordered content links between at least two of the plurality of transmedia content data items and modify 301 the linking data stored in the memory to include the new time-ordered content link.

Figure 5:
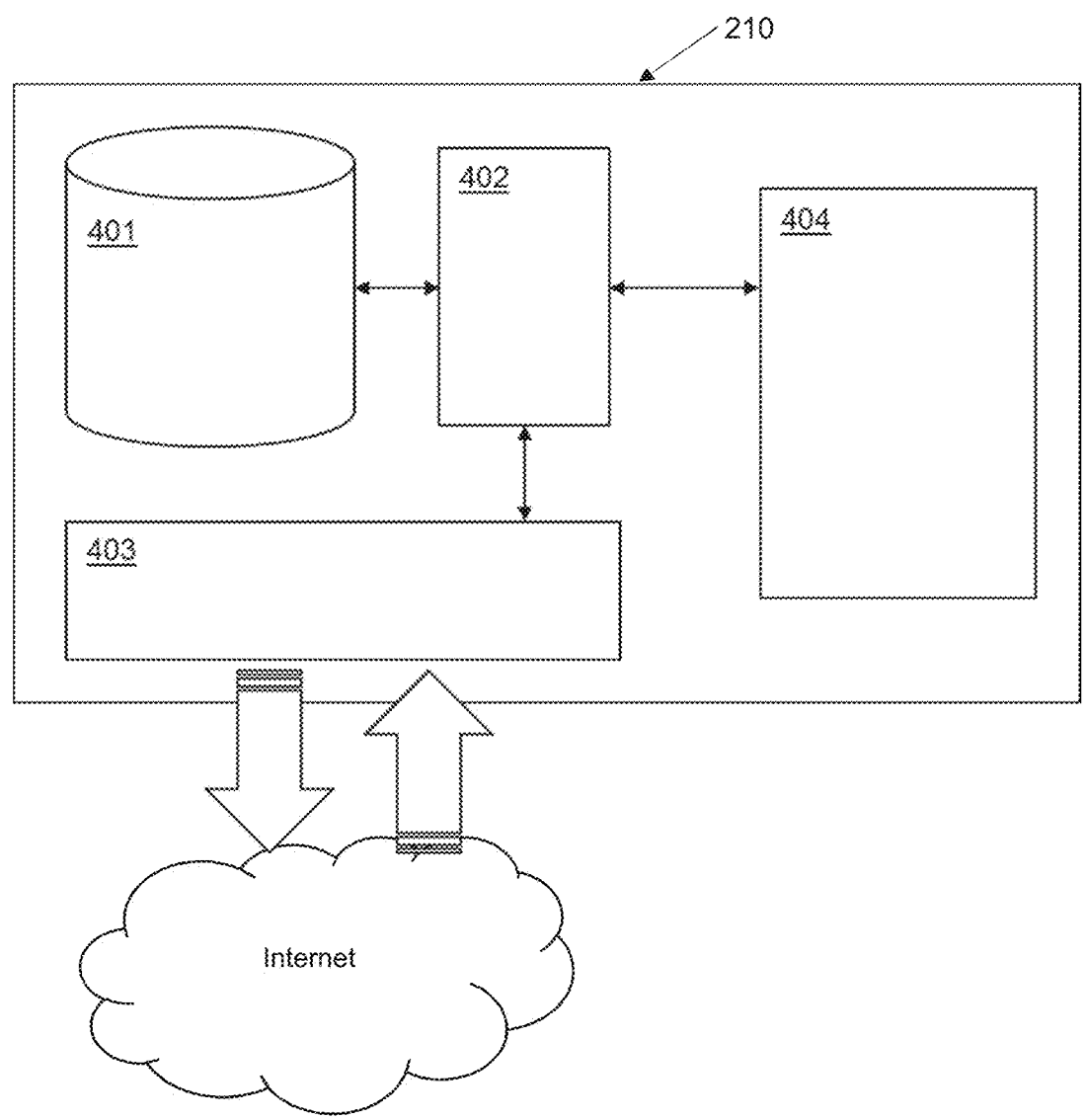
FIG. 5 depicts an exemplary apparatus on which the front end of the present disclosure operates.

FIG. 5 depicts an exemplary front end electronic user device 210 on which the front end 210 of system 200 is provisioned. The user device 210 includes a memory 401, processing circuitry 402, network interface 403 and a user interface 404. The user interface 404 may comprise one or more of: a touch-sensitive input, such as a touch-sensitive display, a touchscreen, pointing device, keyboard, display device, audio output device, and a tablet/stylus. The network interface 403 may be in wired or wireless communication with a network such as the Internet and, ultimately, the server device 230 depicted in FIG. 4. The electronic device 210 receive user input at the user interface 404 and thereby communicates with the server device 230 via the network interface 403 and network interface 303, which provides the processor 302 with instructions to create new time-ordered content links between the transmedia content data items in the memory 301. The electronic device 210 may also provide instructions to the server device 230 to delete or modify existing time-ordered content links and/or transmedia content data items from the memory.

It will be appreciated that the system may comprise multiple electronic devices 210, each configured to receive user input and thereby communicate with the server device 230 and provide instructions to create, delete or modify time-ordered content links between the transmedia content data items. Thus, multiple electronic devices 210, each being accessed by a different user, are adapted to process common content links and content data items.

The memory 301 of the server device 230 may also store user data items, which are associated with users of the system 200 and comprise user identification data, such as a username, password, email address, telephone number and other profile information. The user data items may also comprise, for each user of the system user preference data pertaining to each user's preferences, user behaviour data pertaining to the each user's online behaviours, user interaction data pertaining to the each user's interaction with other users, and/or user location data pertaining to the current determined and/or past determined location of the each user.

The server device 230 may also be configured to implement the user model 234 of the system 200 as mentioned above. The processing circuitry 302 of the device 230 can use the user model 234 to identify user interactions of the users of the system 200 with the transmedia content data items and subsequently update the user interaction data stored in the memory 301 in accordance with the user interaction.

The memory 301 may also store content characterisation data items, which characterise one or more of the transmedia content data items. In particular, the memory 301 may store auditory characterisation data which characterises auditory components the transmedia content data items, visual characterisation data which characterises visual components of the transmedia content data items, textual characterisation data which characterises textual components of the transmedia content data items and/or interaction characterisation data which characterises interactive components, such as games, or quizzes, or puzzles, of the one or more transmedia content data items. The processing circuitry 303 of the server device 230 can be further configured to provide a content subset modelling engine that processes the content characterisation data items for each transmedia content data item in a given transmedia content subset and generates unique subset characterisation data for the transmedia content subset based on the processed characterisation data.

The processing circuitry 302 may also implement the transmedia content recommender engine 238, which is configured to process the characterisation data items and the user data items for a given user and identify transmedia content data items and surface identification(s) of one or more of the transmedia content data items that are predicted to be matched to users, and additionally can surface identification(s) of other matched users of the system 200.

The processing circuitry 302 of the server device may also be configured to implement the experience control layer 232 mentioned above. The experience control layer 232 implements a permission control system which is used to determine whether a given user has permission to view, edit, modify or delete a given transmedia content data item, time-ordered content like, transmedia content subset or non-linear network. Collaboration is a challenge in itself; however, authorship attribution and consistency in particular are supported. A balance is then provided between a very rigid and tight permission system, which might hinder collaboration and discourage potential contributors from sharing their ideas, and an open system which allows any user to modify or delete the content contributed by other users.

For a given transmedia content subset or non-linear network, created by an original first user (referenced hereinafter as "Alice"), and which consists of individual transmedia content data items connected by time-ordered content links therebetween, this transmedia content subset or non-linear network is attributed to and owned by Alice in metadata associated with the transmedia content data items, linking data and the original transmedia content subset and/or non-linear network exclusively. The experience control layer 232 only allows modifications to the original transmedia content subset or non-linear network by Alice. The system 200 is also configured such that a system administrator user or moderator user can provide or change permissions for and between all individual users, regardless of permissions assigned by individual users.

A second user (referenced hereinafter as "Bob") may wish to contribute to the transmedia content subset or non-linear network. Bob may wish to insert a new transmedia content data item into the transmedia content subset or non-linear network, and/or Bob may wish to create new linking data that defines an alternative path through the non-linear network or transmedia content subset.

The experience control layer 232 does not permit Bob to modify the original transmedia content subset or non-linear network that are attributed to and owned by Alice in the metadata. Instead, the experience control layer 232 instructs the processor 302 to create a copy of the original transmedia content subset or non-linear network in the memory 301, which includes the changes to the transmedia content data items and/or linking data input by Bob.

The copy will be exclusively owned by Bob in the metadata associated with the copied transmedia content subset or non-linear network, and as such the experience control layer 232 will permit only Bob to edit or modify the copied transmedia content subset or non-linear network. However, the original transmedia content data items and linking data contributed by Alice remain attributed to Alice in the metadata, and only the new transmedia content data items and linking data are attributed to Bob in the metadata. The copied transmedia content subset or non-linear network maintains a reference to the original transmedia content subset or non-linear network.

As Bob interacts with the content by creating, modifying and editing content items, subsets and non-linear networks, it updates in real time such that all other users can see the changes as they happen, including Alice.

In an alternative embodiment, Bob can interact with the content by creating, modifying and editing content items, subsets and non-linear networks so that the changes at this stage can only be seen by Bob. When Bob is finished and no longer wishes to modify the content, subsets or non-linear networks, he can formally submit his changes and the experience control layer 232 provides the copied transmedia content subset or non-linear network to the user, more particularly to the user device of the user that is indicated by the metadata of the original transmedia content subset or non-linear network as the owner, e.g. Alice's user device, for review. Alice may then choose to "merge" the copied transmedia content subset or non-linear network with the original. The experience control layer 232 will delete the original and modify the metadata of the copy to indicate that Alice is owner of the copied transmedia content subset or non-linear network, since Bob will have previously been designated in the metadata as owner of any items, subsets or networks which were created or modified by him. The metadata of the individual transmedia content items and linking data, other than the owner, is left unchanged.

Alice may approve of the modifications made by Bob, but may wish keep the modifications as an optional alternative. In this case, she will choose to "branch" the original transmedia content subset or non-linear network. The experience control layer 232 will modify the original transmedia content subset or non-linear network to include any new transmedia content data items and linking data contributed by Bob. The metadata of the individual transmedia content items and linking data is unchanged, and the metadata for the modified original transmedia content subset or non-linear network still identifies Alice as the owner.

Finally, Alice may disapprove of the modification made by Bob, and can choose to "push out" Bob's version. This causes the experience control layer 232 to remove the reference link from the copy to the original. Again, the metadata of the individual transmedia content items and linking data is unchanged. This means that Bob's version of the content items, subset and non-linear networks as a result of his creation and/or modifications are now distinct from Alice's, and exists separately in memory with corresponding metadata to indicate that he is the owner of this version.

The system 200 and experience control layer 232 may allow Alice to fully delete Bob's edit, or force the modification to be hidden from other users of the system. Allowing for this option might be required in some cases, for example when copyright is infringed or the content contributed by Bob is inappropriate.

As mentioned above, the system 200 structures groups of content subsets ("storyworlds"), i.e. non-linear networks, as directed graphs of connected transmedia story data items and storylines, i.e. transmedia content subsets, as sequences of connected transmedia content data items out of the generated non-linear networks graphs.

Figure 6:
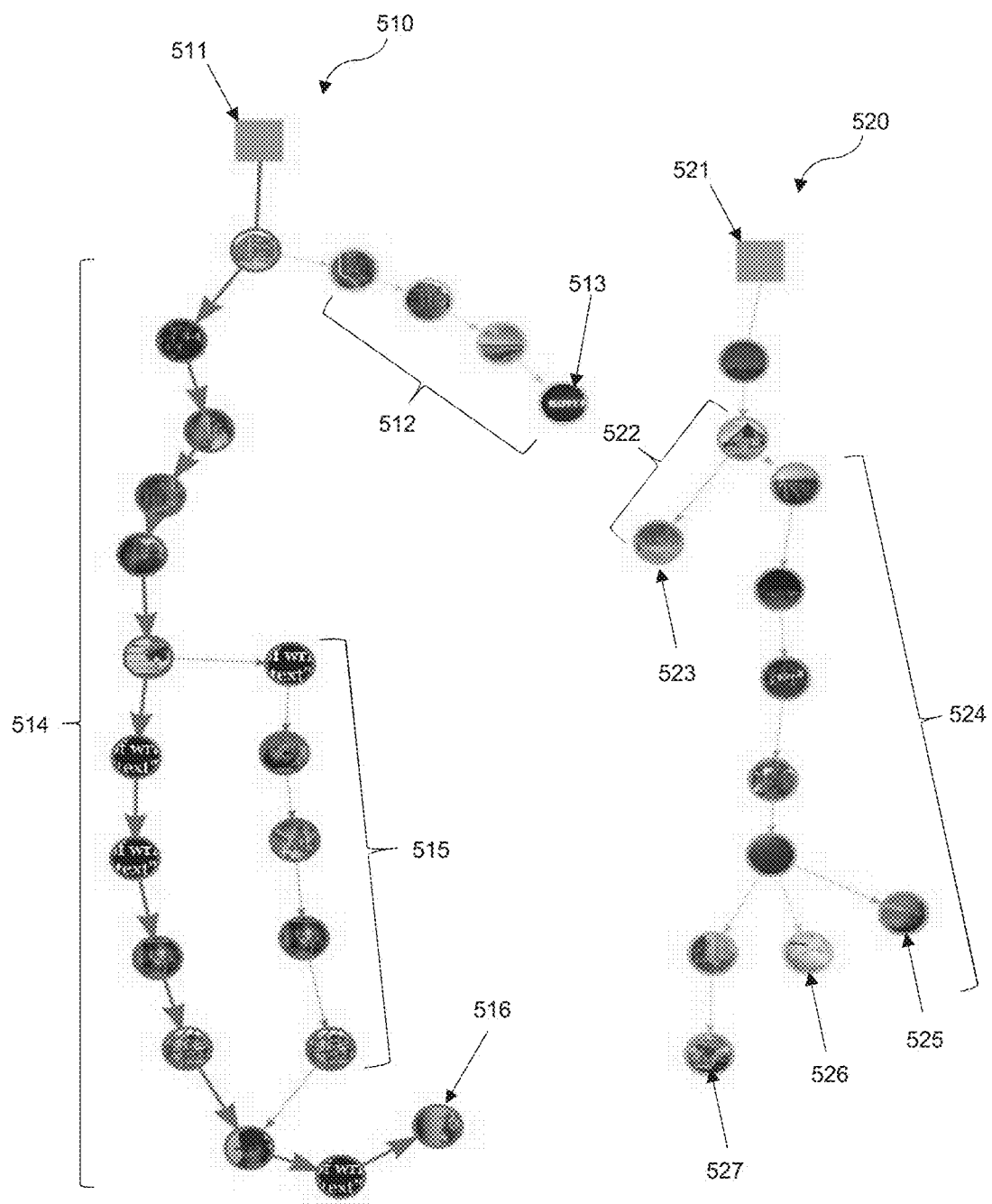
FIG. 6 depicts exemplary non-linear networks of transmedia content data items according to the present disclosure.

The story model component 236 of the system 200 arranges the stories and storyworlds at the transmedia content level based on complex graph metrics. The transmedia content data items are nodes. Edges of the graph define the time-ordered content links between transmedia content data items. The edges and nodes of the graph may be assigned with weights derived from story attributes, e.g. number of likes received by users consuming the story. The graph-based model defines all of the possible consumption flows throughout a given graph and allows identification of transmedia content data items which play key roles within the storyworld. FIG. 6 depicts a graph-model of two non-linear networks of transmedia content data items.

Each depicted non-linear network, 510 and 520 includes at least two subset entry points 511 and 521 which define starting points in the subset (and also any non-linear networks that the subsets are part of) from which the system should begin presenting the transmedia content data items. The first transmedia content data item in each non-linear network has only out-going time ordered content links. Non-linear network 511 has two distinct end points 513, 516, which are transmedia content data items that have only incoming time-ordered content links. End point 513 is preceded by a branch 512 of the non-linear network, which shares only its first data item in common with a second brand 514. Branch 514 has an alternate path 515 which skips several of the transmedia content data items of the rest of the branch and then re-joins the branch 515 to terminate at the end point 516. In contrast, non-linear network 520 has four branches with four distinct end points 523, 525, 526 and 527, which share varying numbers of transmedia content data items in common with one another. The data thus generated and stored which is representative of the non-linear network is structural data indicative of the nodes and edges and links therebetween, thereby defining the time-ordered structure of content data items in for the non-linear network.

It will be appreciated that each transmedia content data item may have any number of incoming or outgoing time ordered content links which connect the transmedia content data item to other transmedia content data items, except for the first and last transmedia content items in a non-linear network, which only have outgoing and incoming time-ordered content links respectively.

Furthermore, each of the non-linear networks 510, 520 may be considered to contain multiple linear paths, which define each unique route through the non-linear network from the entry points to the last transmedia content data item.

In a hierarchical system containing a lot of changing content at different levels (story systems, non-linear networks, transmedia content subsets and individual transmedia content data items) users can easily get lost in irrelevant content (for the user) or unappealing content (for the user). An engine guiding the user and fostering the creation of high quality content is thus provided.

As mentioned above, the system 200 further includes a recommender engine component 238. Users of the system, through the recommender engine component 238, receive suggestions about possible story elements, i.e. transmedia content data items, to be consumed and/or extended with new content. Due to the hierarchic nature of the system, recommendations are issued at different levels of granularity, e.g. story system, non-linear networks, transmedia content subsets and individual transmedia content data items. Furthermore, recommendations are dynamic, i.e. they change with continuously evolving content. Recommendations also take into account preferences of the user to keep the user engaged with processing the time-arranged content items. This can mean that individual content items from the same or other users with sufficiently similar or identical content characteristic metadata, e.g. specifying content with sufficiently similar characters, occurring at sufficiently similar or identical factual or fictional times, or in sufficiently similar or identical factual or fictional times, as the characteristic metadata of the content which has already been utilised (consumed) by the user can be surfaced by the recommender engine component 238.

The recommender engine component 238 is configured to access the memory 301 of the server device 230 and surface one or more individual content items and/or linked transmedia content subsets to a user of the system. The surfaced content items or linked transmedia content subsets are chosen by the recommender engine component from the individual transmedia content data items and transmedia content subsets stored in the memory 301. In the present context, "surface" means that the selected one or more item is/are isolated from other items of content and provided to the user, e.g. as a notification on the user device, or as a special flag associated with the surfaced item.

Figure 7:
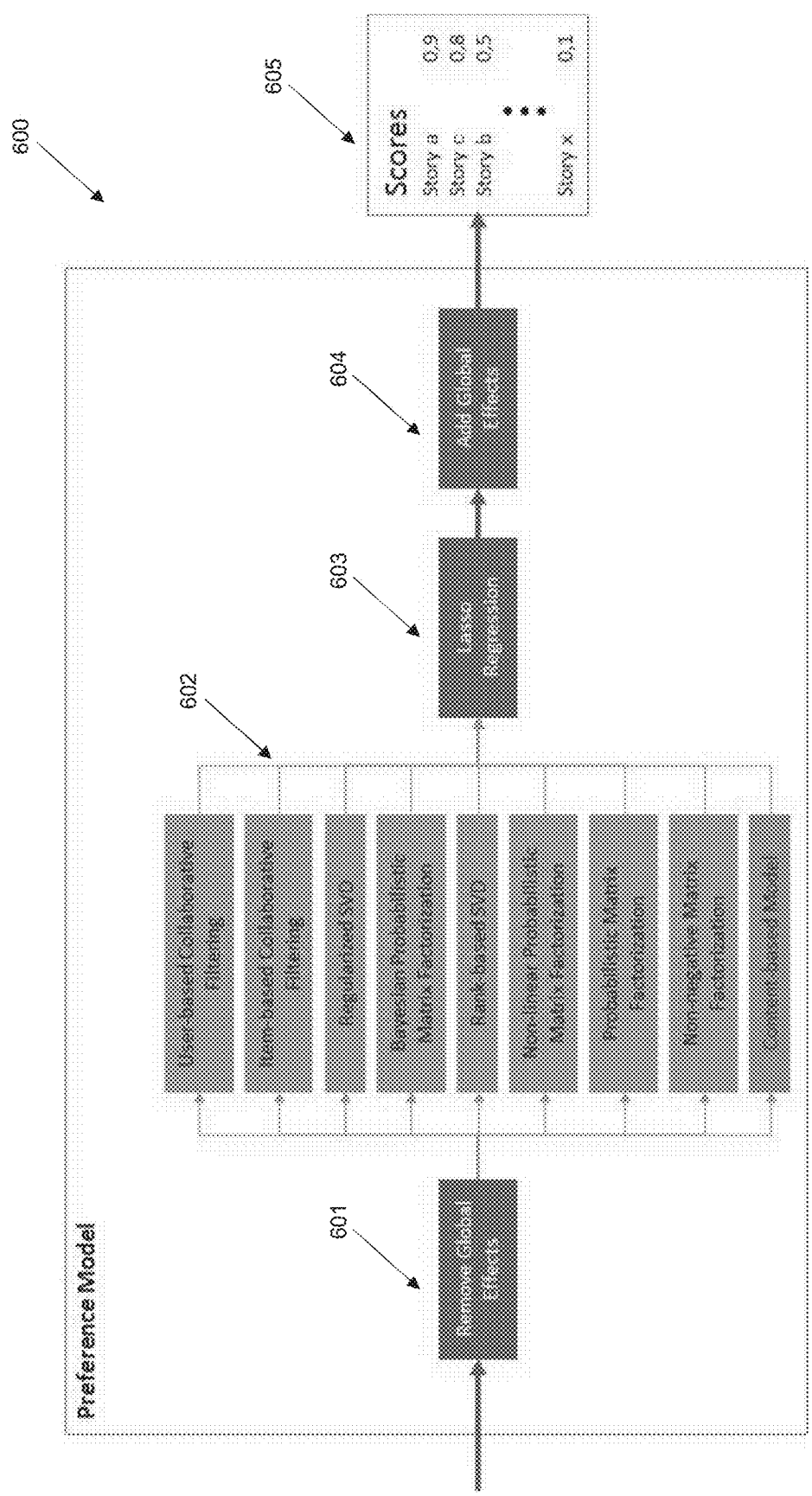
FIG. 7 depicts an exemplary preference model component of the recommender engine component according to the present disclosure.

The recommender engine 238 component may also include a preference model 600 that provides a predicted rating of a given transmedia content data item or transmedia content subset for a specific user of the system 200. The preference model 600 is depicted in FIG. 7. The preference model 600 takes as input one or more transmedia content data items or transmedia content subsets and provides as output predicted rating for each input item for a given user. The preference model 600 achieves this by, at a first step 601, removing global effects. Some users might, for example, tend to constantly give lower ratings than others. Removing this bias before processing the input items improves prediction accuracy. In a second step 602, the model collects the predictions of n independent state of the art algorithms (such as Rank-based SVD). The system then builds an ensemble prediction at step 603 by using a Lasso Regression. In the last step 604, the global effects are added back to the ensemble prediction to obtain the final rating (or score) 605 for the given user.

The recommender engine may also include a user-brand match component, which is configured to provide, for a given user, a prediction of a preference for a given branded content data item, and a branded content model that provides, for a given transmedia content data item, a prediction of the suitability of a given branded content data item, e.g. an advertisement.

The transmedia content recommender engine is configured to query the preference model, user-brand match component and brand model component by providing the preference model, user-brand match component and brand model with a transmedia content parameter, user data for the given user and a given branded content data item, and to maximise the sum of the output for the preference model, user-brand match component and brand model over the transmedia content parameter. This three-dimensional optimisation ensures that users are engaged by relevant, while consuming content containing advertisements of a desired brand.

The transmedia content recommender engine is configured to surface the transmedia content data item or transmedia content subset that has the maximum output of the three-dimensional optimisation.

The recommender engine component 238 may also take into account a given user's defined preferences, and other predicted properties such as user behaviour, or emotional state. In order to achieve this, the recommender engine component 238 communicates with the user model component 234 depicted in FIG. 3 and shown in more detail in FIG. 8. The user model component 234 includes a state model 701, behaviour model 702, user profile 703, interaction model 704 and talent harvest component 705.

Modelling the state of the user, using state model component 701 permits personalised recommendations to be provided by the recommender engine component 238, and also provides accurate predictions of user behaviour by the behaviour model component 702. The state model component 701 may also be used to customise the user interface 218 and encourage users to create new content, i.e. new transmedia content data items and time-ordered content links, within the system 200. The state model component 701 represents and predicts the continuous creational, emotional and affective state of users of the system 200. The creational state describes if the user is in the mood for consuming transmedia content subsets or non-linear networks or contributing their own transmedia content data items and time-ordered content links. The affective state indicates whether the user is, for example, motivated or bored. The emotional state describes the emotions that individual transmedia content data items or transmedia content subsets/non-linear networks trigger in the user.

Due to the hierarchy of the system, i.e. the logical separation of transmedia content into levels of the individual transmedia content data items, transmedia content subsets, non-linear networks and story universe, user behaviour is predicted at different levels of granularity in two main dimensions, namely: (1) the transmedia content hierarchy; and (2) the interaction of users with other users. User dynamics are of interest at different levels of user granularity, for example in respect of: single users, small groups, audiences. The behaviour model component 702 predicts the user behaviour in both of these dimensions and provides insights into dynamic behaviour for load balancing, information about the most likely path of a user through a given non-linear network and predicts the evolution of the whole system 200.

The user preference component 703 provides a detailed profiling for each user of the system 200, including, for example, demographics (e.g. age, gender, etc.), personality traits (e.g. Big 5) and location data (GPS).

The interaction model component 704 monitors and predicts social interactions of users. The analysis and prediction of social interactions of groups of contributors can be used by the system 200 to encourage collaboration across all levels of the system, predict the quality of stories and influence user community building.

Talent harvest component 705 identifies users of the system 200 with exceptional talent at creating transmedia content, and categorises these users according to their type of talent, e.g. a Star Wars expert, an artist doing funny comic strips or a user resonating with a specific audience.

The user model component 234 is connected to and in communication with the story model component 236, the recommender engine component 238 and the metadata extraction component 240, with these components being both inputs and outputs to the user model component 234, allowing data exchange therebetween.

Navigating through a large quantity of transmedia content data items, transmedia content subsets and non-linear networks that are provided to users by the system 200, in a way that users and user groups can create and consume the data quickly on a range of devices, including personal computers, laptops, tablets, mobile devices etc. is challenging. The user interface component 218 guides the user in a non-disruptive way, whilst also avoiding repetitive meandering and visual overload of content creation and navigation tools on the multiple, hierarchical levels of the transmedia content.

The user interface component 218 presents the transmedia content data items, transmedia content subsets and non-linear networks as follows. A three-dimensional representation is utilised based on one or more three-dimensional shapes which can be manipulated by the user. In a two-dimensional system involving a two-dimensional display screen, a two-dimensional representation of the three-dimensional shape(s) is/are generated, and the shape(s) utilised may be one or more spheres or ellipsoids, which use hierarchically-connected visual metaphors to provide further information on the transmedia content data items and how they are related and connected in a time-based manner for users and groups of users. This is achieved in a non-disruptive and non-distracting manner. It will be appreciated that any three-dimensional object may be used to present the transmedia content. In one embodiment of the present invention, the visual metaphors can equate to features of a planet, such as continental landmasses, oceans, clouds, mountain ranges and coastlines.

Figure 9B:
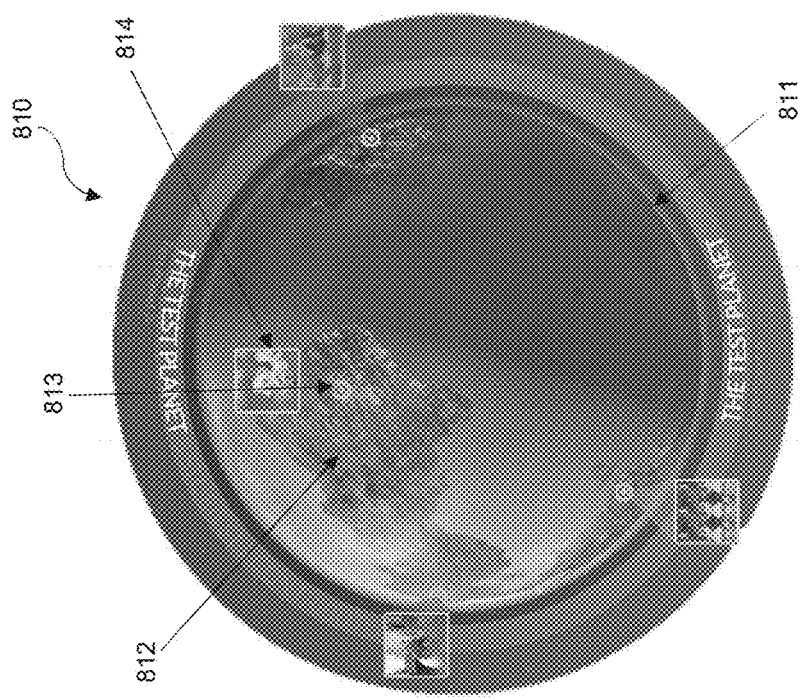
FIGS. 9A and 9B depict exemplary user interfaces that are rendered and output by the system.
Figure 9A:
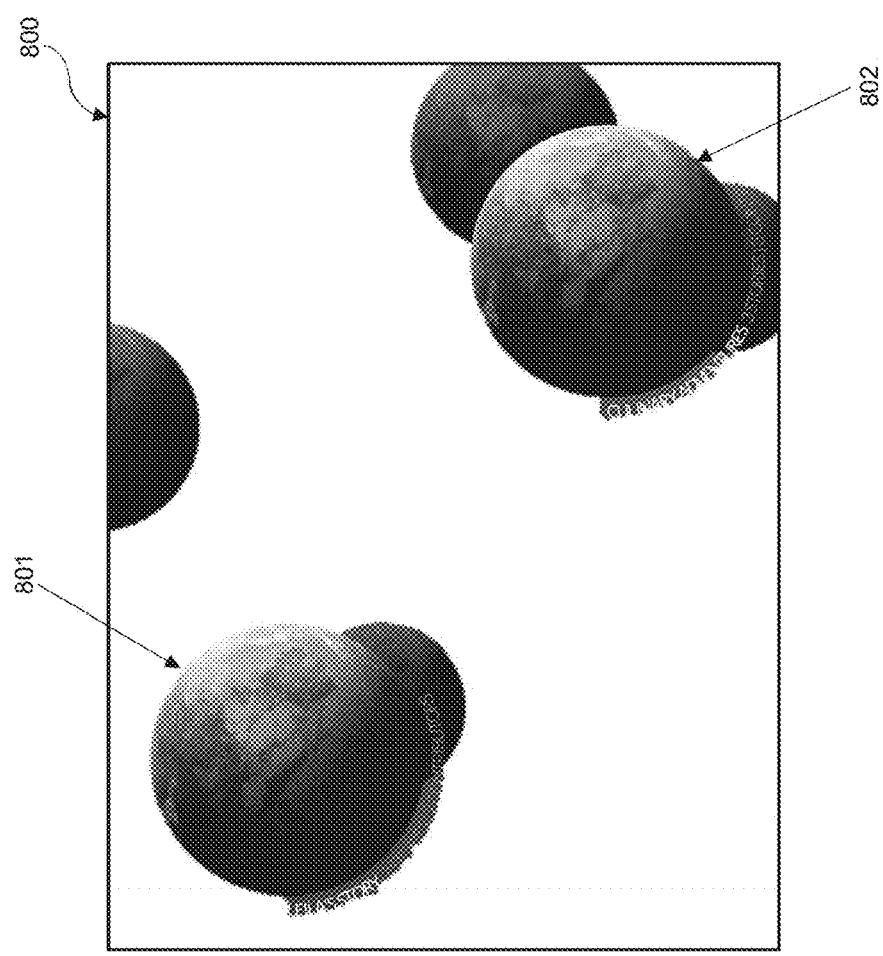

FIGS. 9A and 9B depict an example of the user interface that is presented to a user of the system 200 at different levels of the hierarchical tree structure. FIG. 9A depicts a higher-level view of the transmedia content 800 which depicts several spheres 801, 802. Each sphere 801, 802 represents a storyworld, i.e. groups of transmedia content subsets and non-linear networks that are semantically similar, e.g. the constituent transmedia content data items relate to the same story characters or story universe. The spheres themselves may be visually clustered together in the displayed three-dimensional representation according to semantic similarity between the storyworlds.

A user may select one of the spheres 801, 802, which causes the user interface 800 to transition to a modified user interface 810, which depicts the selected single sphere 811 with additional detail. Additional surface features of the selected sphere 811 are displayed in user interface 810, such as individual transmedia content subsets or non-linear networks indicated by icons 813, and representative images of the content 814. The visual metaphors are provided such that semantically similar transmedia content subsets and non-linear networks are depicted on the same continents 812 on the surface of the planet 811. When a user wishes to consume or edit an individual transmedia content subset or non-linear network, the user can select one of the icons 813 or images 814 and the user interface 810 transitions to show a graph-structure of the subset/network and/or the individual transmedia content data items.

Figure 10:
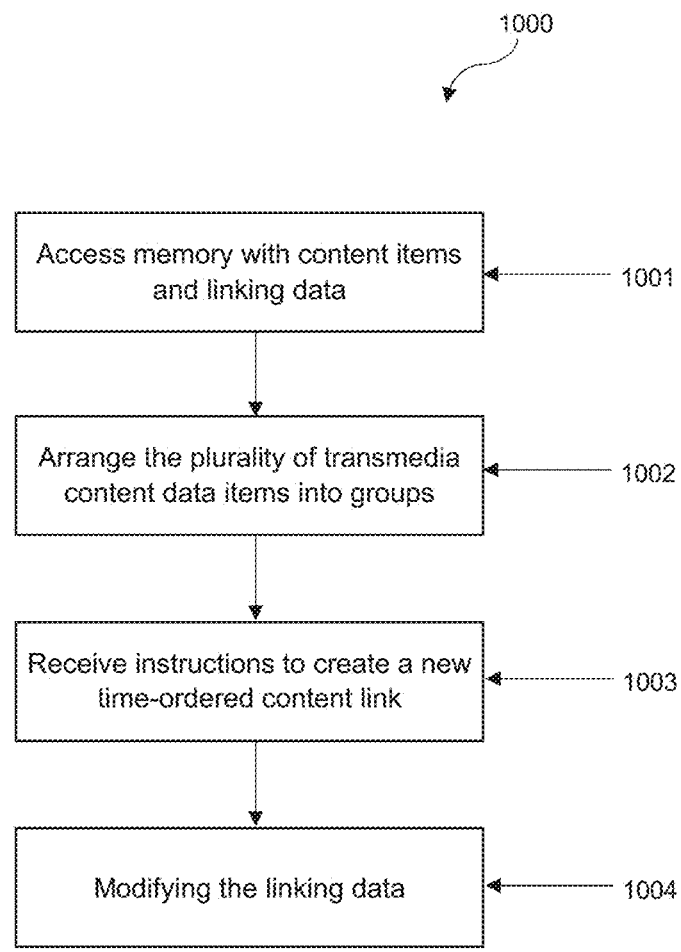
FIG. 10 depicts a process for modifying the linking data according to the present disclosure.

FIG. 10 depicts a process for modifying the linking data which defines time-ordered content links between transmedia content data items stored in the memory 301 of the server device 230. At step 1001 a memory, i.e. the memory 301 of server device 230, is accessed. The memory 301 stores a plurality of transmedia content data items and the associated linking data. At step 1002, the processing circuitry 302 of the server device 230 arranges the plurality of transmedia content data items into linked transmedia content subsets made up of different groups of the transmedia content data items and the time-ordered content links between the elements of those groups. At step 1003, the server device 230 receives one or more instructions to create a new time-ordered content link between at least two of the plurality of transmedia content data items, e.g. from an electronic device 210 via network interface 303. At step 1004, the processing circuitry 302 modifies the linking data stored in the memory 301 to include the new time-ordered content link indicated by the received instructions.

While some exemplary embodiments of the present disclosure have been shown in the drawings and described herein, it will be appreciated that the methods described herein may be deployed in part or in whole through a computing apparatus that executes computer software, program codes, and/or instructions on processing circuitry, which may be implemented by or on one or more discrete processors. As a result, the claimed electronic device, apparatus and system can be implemented via computer software being executed by the processing circuitry. The present disclosure may be implemented as a method in a system, or on an apparatus or electronic device, as part of or in relation to the apparatus or device, or as a computer program product embodied in a computer readable medium executable on one or more apparatuses or electronic devices.

A processor as disclosed herein may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. Each processor may be realized as one or more microprocessors, microcontrollers, embedded microcontrollers, programmable digital signal processors or other programmable device, along with internal and/or external memory. A given processor may also, or instead, be embodied as an application specific integrated circuit, a programmable gate array, programmable array logic, or any other device or combination of devices that may be configured to process electronic signals. In addition, each processor may enable execution of multiple programs, threads, and codes. The threads may be executed simultaneously to enhance the performance of the processor and to facilitate simultaneous operations of the application. By way of implementation, the methods, program codes, program instructions and the like described herein may be implemented in one or more thread. The thread may spawn other threads that may have assigned priorities associated with them; the processor may execute these threads based on priority or any other order based on instructions provided in the program code.

Each processor may access one or more memories, for example one or more non-transitory storage media which store the software, executable code, and instructions as described and claimed herein. A storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and/or processes disclosed herein, and steps associated therewith, may be realized in hardware, software or a combination of hardware and software suitable for a particular application. The hardware may include a general purpose computer and/or dedicated computing device or specific computing device or particular aspect or component of a specific computing device.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, the methods described above and combinations thereof may be embodied in computer executable code that, when executing on one or more computing devices, performs the steps thereof. In another aspect, the methods may be embodied in a system that performs the steps thereof, and may be distributed across electronic devices in a number of ways, or all of the functionality may be integrated into a dedicated, standalone electronic device or other hardware. In another aspect, the means for performing the steps associated with the processes described above may include any of the hardware and/or software described above.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising", "having", "including", and "containing" are to be construed as open-ended terms (i.e. meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g. "such as") provided herein, is intended merely to better illuminate the disclosure and does not pose a limitation on the scope of the disclosure unless otherwise claimed.

The present disclosure has been provided above by way of example only, and it will be appreciated that modifications of detail can be made within the scope of the claims which define aspects of the invention.

The invention claimed is:

1. An apparatus for managing non-linear transmedia content data comprising:
　a memory configured to store a plurality of transmedia content data items and associated linking data which define time-ordered content links between the plurality of transmedia content data items, the plurality of transmedia content data items being arranged into linked transmedia content subsets comprising different groups of the transmedia content data items and different time-ordered content links therebetween, wherein the time-ordered content links indicate an order in which linked transmedia content data items are presented;
　a processor, in communication with the memory, configured to utilize a control engine to:
　　receive, from an electronic device, one or more instructions to create a new time-ordered content link between at least two of the plurality of transmedia content data items;
　　modify the associated linking data stored in the memory to include the new time-ordered content link;
　　identify a plurality of content characterization data items that characterizes the plurality of transmedia content data items stored in the memory and a plurality of user data items for a user that identify previously consumed transmedia content data items of the user, the content characterization data items comprising visual characterization data pertaining to one or more visual components of the plurality of transmedia content data items;
　　identify, using a recommender engine, from the content characterization data items, one or more new transmedia content data items that are associated with one or more first content characteristic metadata that match one or more second content characteristic metadata that specifies at least one of: similar characters, similar or identical factual times, or similar or identical fictional times of the previously consumed transmedia content data items of the user, wherein the one or more new transmedia content data items comprise at least one of: stories, story arcs, or story systems to be extended with new content; and
　　generate a graph structure with nodes representing transmedia content data items and connections representing the time-ordered content links to notify the user of the one or more new transmedia content data items, wherein the graph structure graphically illustrates an evolution in the transmedia content data items and the time-ordered content links since a last login of a given user in a time lapse rendering of changes of the linked transmedia content subsets and non-linear networks in an order in which the changes occurred.

2. The apparatus of claim 1, wherein the content characterization data items further comprise interaction characterization data pertaining to one or more interactive components of the plurality of transmedia content data items.

3. The apparatus of claim 1, wherein the content characterization data items further comprise auditory characterization data pertaining to one or more auditory components of the plurality of transmedia content data items.

4. The apparatus of claim 1, wherein the content characterization data items further comprise textual characterization data pertaining to one or more textual components of the plurality of transmedia content data items.

5. A system comprising:
an apparatus for managing non-linear transmedia content data, the apparatus comprising:
 a memory configured to store a plurality of transmedia content data items and associated linking data which define time-ordered content links between the plurality of transmedia content data items, the plurality of transmedia content data items being arranged into linked transmedia content subsets comprising different groups of the transmedia content data items and different time-ordered content links therebetween, wherein the time-ordered content links indicate an order in which linked transmedia content items are presented;
 a processor, in communication with the memory, configured to utilize a control engine to:
  receive, from an electronic device, one or more instructions to create a new time-ordered content link between at least two of the plurality of transmedia content data items;
  modify the associated linking data stored in the memory to include the new time-ordered content link;
  identify a plurality of content characterization data items that characterizes the plurality of transmedia content data items stored in the memory and a plurality of user data items for a user that identify previously consumed transmedia content data items of the user, the content characterization data items comprising visual characterization data pertaining to one or more visual components of the plurality of transmedia content data items;
  identify, using a recommender engine, from the content characterization data items, one or more new transmedia content data items that are associated with one or more first content characteristic metadata that match one or more second content characteristic metadata that specifies at least one of: similar characters, similar or identical factual times, or similar or identical fictional times of the previously consumed transmedia content data items of the user, wherein the one or more new transmedia content data items comprise at least one of: stories, story arcs, or story systems, to be extended with new content; and
  generate a graph structure with nodes representing transmedia content data items and connections representing the time-ordered content links to notify the user of the one or more new transmedia content data items, wherein the graph structure graphically illustrates an evolution in the transmedia content data items and the time-ordered content links since a last login of a given user in a time lapse rendering of changes of the linked transmedia content subsets and non-linear networks in an order in which the changes occurred; and
an electronic device configured to be in communication with the apparatus, and further configured to receive user input and thereby communicate with the processor and provide the one or more instructions to create each new time-ordered content link between the at least two of the plurality of transmedia content data items.

6. The system of claim 5, further comprising at least one additional electronic device configured to receive user input and thereby communicate with the processor and provide instructions to create time-ordered content links between at least three of the plurality of transmedia content data items.

7. The system of claim 5, wherein the memory is further configured to store:
 the plurality of user data items associated with the user of the system.

8. The system of claim 5, wherein the plurality of user data items comprises at least user identification data or a user profile for the user associated with the plurality of user data items.

9. The system of claim 8, wherein the plurality of user data items comprises the user profile, and the user profile comprises one or more of:
 user preference data pertaining to preferences of the user;
 user behavior data pertaining to online behaviors of the user;
 user interaction data pertaining to an interaction of the user with other users; or
 user location data pertaining to a current determined user location, a past determined user location or a combination thereof.

10. The system of claim 5, wherein the processor is further configured to provide a user modelling engine configured to identify user interaction of the user with one or more transmedia content data items of the plurality of transmedia content data items and update user interaction data of the user to be indicative of the one or more transmedia content data items thereby interacted with.

11. The system of claim 5, wherein the memory is further configured to store:
 the plurality of content characterization data items, each content characterization data item characterizing one or more of the transmedia content data items of the plurality of transmedia content data items, wherein each of the one or more transmedia content data items is associated with at least one of the content characterization data items.

12. The system of claim 5, wherein the processor is further configured to provide a content subset modelling engine configured to process at least one content characterization data item for each transmedia content data item in a transmedia content subset and thereby generate unique subset characterization data for the transmedia content subset based on at least one of the identified content characterization data items.

13. The system of claim 5, wherein the time-ordered content links define a narrative order of the transmedia content data items.

14. The system of claim 5, wherein each time-ordered content link defines a directional link between two transmedia content data items of the plurality of transmedia content data items.

15. The system of claim 14, wherein one of the two transmedia content data items has a plurality of outgoing time-ordered content links.

16. The system of claim 14, wherein one of the two transmedia content data items has a plurality of incoming time-ordered content links.

17. The system of claim 5, wherein the memory is further configured to store a plurality of subset entry points for the linked transmedia content subsets.

18. The system of claim 17, wherein each subset entry point is a flag indicating a transmedia content data item that has at least one outgoing time-ordered content link and no incoming time-ordered content links.

19. The system of claim 5, wherein each linked transmedia content subset defines a linear path, wherein the linear path comprises a subset entry point, one or more transmedia content data items and one or more time-ordered content links between the subset entry point and the transmedia content data items.

20. The system of claim 5, wherein two or more linked transmedia content subsets share one or more subset entry points, one or more transmedia content data items, one or more time-ordered content links, or a combination thereof.

21. The system of claim 5, wherein the processor is configured to transmit transmedia content data comprising the associated linking data and one or more of the transmedia content data items to the electronic device.

22. The system of claim 21, wherein the electronic device further comprises a communication layer, wherein at least one of the transmedia content data items is received via the communication layer and instructions are provided to the processor via the communication layer.

23. The system of claim 22, wherein the communication layer is configured to check that a user account associated with the electronic device is permitted to:
view the transmedia content data items;
provide one or more instructions to create the new time-ordered content link between at least two of the plurality of transmedia content data items; or
a combination thereof.

24. The system of claim 23, wherein the communication layer is configured to prevent the electronic device from:
outputting at least one of the transmedia content data items;
providing one or more instructions to create the new time-ordered content link if the user account is not permitted; or
a combination thereof.

25. The system of claim 5, wherein the electronic device is configured to output the transmedia content data items on an output device connected to the electronic device such that the user is presented with the transmedia content data items on the output device.

26. The system of claim 5, wherein the electronic device is configured to accept input, via a user input interface, indicative of a subset entry point.

27. The system of claim 5, wherein the electronic device is configured to output a selected transmedia content data item indicated by a selected subset entry point.

28. The system of claim 5, wherein the electronic device is configured to display each subsequent transmedia content data item in turn according to time-ordered content links between the transmedia content data items.

29. The system of claim 5, wherein the electronic device is configured to receive input, via a user input interface, indicative of one of a plurality of transmedia content subsets when a currently output transmedia content data item is shared among the plurality of transmedia content subsets.

30. The system of claim 5, wherein the electronic device is configured to receive input, via a user input interface, to skip a selected transmedia content data item and output a selected transmedia content data item to a display.

31. The system of claim 5, further comprising an experience control layer, wherein the processor is configured to transmit the transmedia content data items to the electronic device via the experience control layer, and wherein instructions to create the new time-ordered content link are received from the electronic device via the experience control layer.

32. The system of claim 31, wherein the experience control layer is configured to check that a user account associated with the electronic device is permitted to view the new time-ordered content link between the at least two of the plurality of transmedia content data items.

33. The system of claim 5, wherein the content characterization data items further comprise interaction characterization data pertaining to one or more interactive components of the plurality of transmedia content data items.

34. The system of claim 5, wherein the content characterization data items further comprise auditory characterization data pertaining to one or more auditory components of the plurality of transmedia content data items.

35. The system of claim 5, wherein the content characterization data items further comprise textual characterization data pertaining to one or more textual components of the plurality of transmedia content data items.

36. A computer-implemented method for managing non-linear transmedia content data comprising:
providing a memory configured to store a plurality of transmedia content data items and associated linking data which define time-ordered content links between the plurality of transmedia content data items;
arranging the plurality of transmedia content data items into linked transmedia content subsets comprising different groups of the transmedia content data items and different time-ordered content links therebetween, wherein the time-ordered content links indicate an order in which linked transmedia content items are presented;
receiving one or more instructions to create a new time-ordered content link between at least two of the plurality of transmedia content data items;
modifying the associated linking data stored in the memory to include the new time-ordered content link;
identifying a plurality of content characterization data items that characterize the plurality of transmedia content data items stored in the memory and a plurality of user data items for a user that identify previously consumed transmedia content data items of the user, the content characterization data items comprising visual characterization data pertaining to one or more visual components of the plurality of transmedia content data items;
identifying, using a recommender engine, from the content characterization data items, one or more new transmedia content data items that are associated with one or more first content characteristic metadata that match one or more second content characteristic metadata that specifies at least one of: similar characters, similar or identical factual times, or similar or identical fictional times of the previously consumed transmedia content data items of the user, wherein the one or more new transmedia content data items comprise at least one of: stories, story arcs, or story systems to be extended with new content; and generating a graph structure with nodes representing transmedia content data items and connections representing the time-ordered content links to notify the user of the one or more new transmedia content data items, wherein the graph structure graphically illustrates an evolution in the transmedia content data items and the time-ordered content links since a last login of a given user in a time lapse rendering of changes of the linked transmedia content subsets and non-linear networks in an order in which the changes occurred.

\* \* \* \* \*